United States Patent
Smith

(10) Patent No.: US 6,571,306 B1
(45) Date of Patent: May 27, 2003

(54) BUS REQUEST MECHANISM FOR BUS MASTER WHICH IS PARKED ON A SHARED BUS

(75) Inventor: Brian L. Smith, Sunnyvale, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/502,526

(22) Filed: Feb. 9, 2000

(51) Int. Cl.[7] .................. G06F 13/36; G06F 13/362
(52) U.S. Cl. .................. 710/240; 710/113; 710/241
(58) Field of Search .................. 710/240, 116, 710/243, 113, 107, 119, 241, 242, 244, 36, 40

(56) References Cited

U.S. PATENT DOCUMENTS 5,954,809 A * 9/1999 Riley et al.
5,983,302 A * 11/1999 Christiansen et al.
6,101,570 A   8/2000 Neumyer
6,272,580 B1 * 8/2001 Stevens et al.

OTHER PUBLICATIONS

*PCI Local Bus Specification*, Revision 2.2, Dec. 1998, pp. 1–6 and 46–74.

* cited by examiner

*Primary Examiner*—Gopal C. Ray
(74) *Attorney, Agent, or Firm*—B. Noël Kivlin; Meyertons, Hood, Kivlin, Kowert & Goetzel, P.C.

(57) ABSTRACT

A method and mechanism for arbitrating access to a bus. A client which is parked on a bus is allowed to gain access to the bus without having to go through arbitration. A client which is parked on the bus does not request access to the bus before beginning a transaction. If another client makes a high priority request for the bus, it gains access to the bus over a parked client. The parked client keeps a count of detected high priority request cycles. Upon reaching a threshold, the parked client requests the bus. The high priority client may then be made aware of the parked client's need for the bus and yield at an appropriate time.

20 Claims, 6 Drawing Sheets

BUS REQUEST MECHANISM FOR BUS MASTER WHICH IS PARKED ON A SHARED BUS

BACKGROUND OF THE INVENTION

1. Field of the Invention

This invention is related to the field of microprocessors and computer networks and, more particularly, to bus masters and bus protocols.

2. Description of the Related Art

While individual computers enable users to accomplish computational tasks which would otherwise be impossible by the user alone, the capabilities of an individual computer can be multiplied by using it in conjunction with one or more other computers. Individual computers are therefore commonly coupled together to form a computer network.

Computer networks may be interconnected according to various topologies. For example, several computers may each be connected to a single bus, they may be connected to adjacent computers to form a ring, or they may be connected to a central hub to form a star configuration. These networks may themselves serve as nodes in a larger network. While the individual computers in the network are no more powerful than they were when they stood alone, they can share the capabilities of the computers with which they are connected. The individual computers therefore have access to more information and more resources than standalone systems. Computer networks can therefore be a very powerful tool for business, research or other applications.

When multiple computers share a common bus, it becomes necessary to provide a mechanism for controlling access to that bus. Typically an arbitration scheme is used to control which device requiring access to the bus, or "bus master", is granted control of the bus at any given time. Examples of bus masters may include microprocessors, I/O devices, communication devices and other devices capable of initiating transactions on a bus. Arbitration generally involves a bus master requesting access to the bus and a subsequent grant of access to the bus. Arbitration schemes may be either distributed or centralized. Once a bus master is granted control of the bus, it may begin its transaction. The process of arbitrating for control of the bus creates additional overhead for transactions which may reduce system performance. By eliminating the arbitration process, transaction overhead may be reduced and overall system performance improved. One method of eliminating bus arbitration is to use what is called bus "parking". Bus parking involves allowing a particular bus master to have a default bus grant. This parked bus master may then initiate transactions without first arbitrating for bus access by issuing a bus request.

In some computer networks there may be devices connected to the common bus which are not required to arbitrate for access in the same manner as other bus masters. For example, a repeater may be able to issue a high priority request on a bus and be assured of gaining access without having to arbitrate. In such a case, the parked status of a bus master on the network may remain unchanged. One problem which may arise in such a computer network occurs when a device such as a repeater gains control of the bus and begins a stream of transactions, while at the same time a parked bus master requires access to the bus. However, a parked bus master will not issue a bus request and will not initiate a transaction while the repeater indicates a high priority transaction is in progress. Consequently, the repeater has no way of knowing that the bus master requires access to the bus. One possible solution to this problem involves stopping the repeater periodically to allow a parked bus master to initiate a transaction if necessary. However, such a solution may involve stopping transactions unnecessarily when no bus master requires access to the bus, reducing performance.

SUMMARY OF THE INVENTION

The problems outlined above are in large part solved by a bus master and method as described herein. When a parked bus master sees a threshold number of high priority transaction cycles, it issues a request for access to the bus. Advantageously, a high priority device may be made aware of the need for the bus by the parked bus master only when it is actually needed and system performance may be improved.

Broadly speaking, a computer network is contemplated comprising a plurality of bus masters coupled to a bus. A first bus master of the plurality of bus masters may be parked on the bus, and may assert a bus request, in response to detecting a threshold number of consecutive high priority cycles on the bus have been seen and the first bus master requires access to the bus. In addition, a high priority device is coupled to the bus which may inhibit the first bus master from beginning a transaction on the bus.

Also contemplated is a bus master comprising a counter and bus access circuitry. The counter counts the number of consecutive high priority cycles seen on the bus, while the bus access circuitry may assert a bus request, in response to the counter meeting a threshold number of consecutive high priority cycles on the bus and the bus master requires access to the bus.

Further contemplated is a method comprising parking a bus master on a bus, issuing a high priority transaction on the bus by a high priority device, and inhibiting the bus master from issuing a transaction on the bus by asserting an inhibit signal from the high priority device. Also, counting consecutive high priority cycles of the high priority transaction on the bus and issuing a first bus request, wherein the first bus request is issued by the bus master, in response to detecting a threshold number of said consecutive high priority cycles on the bus have been seen and the bus master requires access to the bus.

BRIEF DESCRIPTION OF THE DRAWINGS

Other objects and advantages of the invention will become apparent upon reading the following detailed description and upon reference to the accompanying drawings in which.

Figure 1:
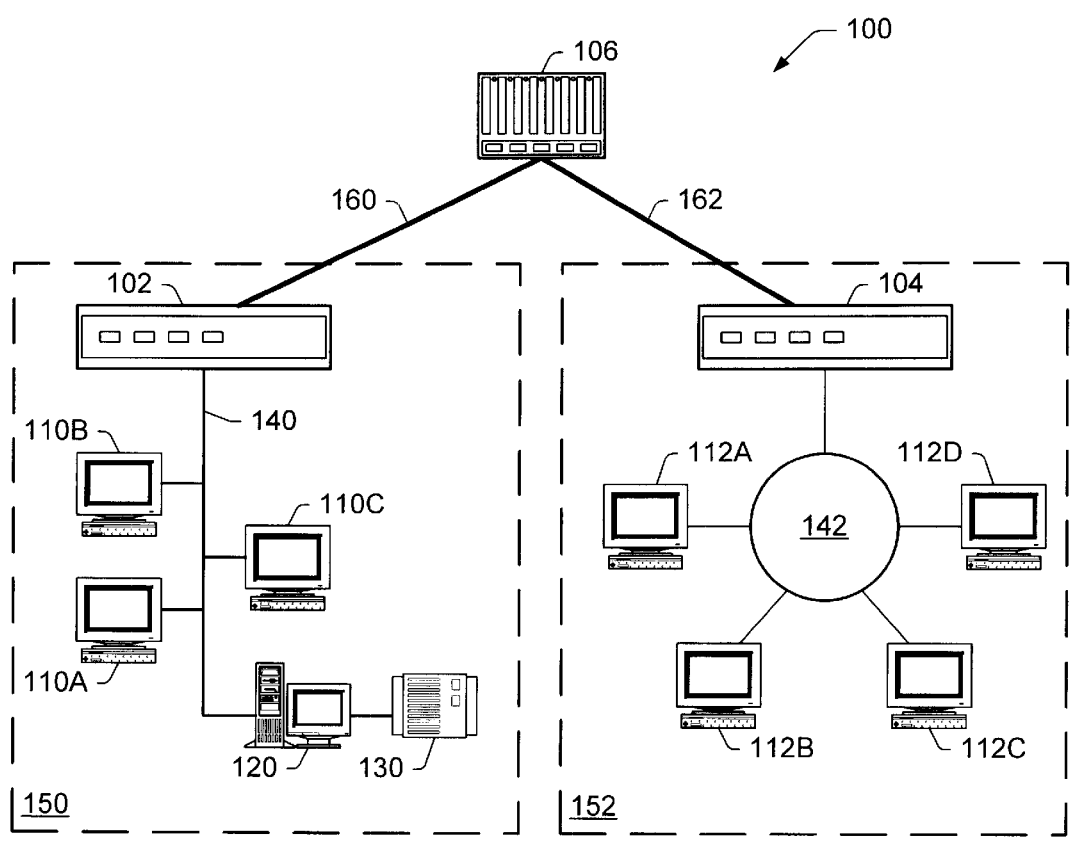
FIG. 1 is an illustration of a computer network in which the invention may be embodied.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a diagram of one embodiment of a computer network 100 is shown. Other embodiments are possible and contemplated. As shown in FIG. 1, computer network 100 includes sub-networks 150 and 152, workstations 110 and 112, server 120, disk array 130, and interconnection devices 106, 102 and 104. Interconnection devices 106, 102 and 104 may include bridges, routers, repeaters or other similar devices. Elements referred to herein with a particular reference number followed by a letter will be collectively referred to by the reference number alone. For example, workstations 110A–110C will be collectively referred to as workstations 110. Workstations 110, server 120 and device 102 are coupled to bus 140. Workstations 112 and device 104 are coupled to bus 142. Device 104 is coupled to device 106 via bus 162. Finally, device 104 is coupled to device 102 via bus 160.

Bus Arbitration

In the network of FIG. 1, two sub-networks 150 and 152 are coupled to one another via device 106. In one embodiment, each sub-network, 150 and 152, uses an arbitration scheme to control access to a shared bus. Sub-network 150 includes workstations 110, server 120, disk array 130 and device 102. In the embodiment shown, workstations 110, server 120, and device 102 are all coupled to a common bus 140. In a centralized arbitration scheme, devices which are connected to a bus and are capable of initiating transactions on that bus (such a device is commonly referred to as a "bus master") must first request access to the bus before initiating a transaction. A centralized arbiter monitors all requests for access to the bus and grants a particular bus master control of the bus according to some algorithm.

As an example, server 120 may be configured to act as a central arbiter for sub-network 150. If workstations 110A and 110B both require access to a storage device in workstation 110C, workstations 110A and 110B may both assert a bus request signal. Server 120, acting as arbiter, may receive the bus requests from workstations 110A and 110B. Server 120 may then grant one of the requesting workstations, 110A or 110B, access to the bus. In granting access to the bus, server 120 may utilize a first-come-first-serve, round robin, or any number of other well known schemes. Subsequent to being granted access to the bus, the bus master which was granted access may initiate a transaction. Even when only a single bus master, say work station 110A, requires access to the bus, the bus master must go through the process of requesting access to the bus and being granted access to the bus by the arbiter. When a bus master completes a transaction, it must repeat the request/grant process in order to gain access to the bus again. Because of this arbitration process, overhead is added to each transaction and system performance may be reduced.

Another possible arbitration scheme is the distributed scheme. In FIG. 1, sub-network 152 may utilize a distributed arbitration scheme. In distributed arbitration, there is not central arbiter to monitor requests for access to the bus and grant access to the bus. Rather, each bus master sees all bus requests and determines whether or not it has priority to take control of the bus. In FIG. 1, workstations 112 are coupled to bus 142. When a workstation requires access to the bus, it may assert a bus request signal which is seen by all other workstations connected to the bus. In one embodiment, the first workstation to assert a bus request is granted access to the bus. When a particular bus master is granted access to the bus, the other bus masters may be configured to wait a predetermined period of time before asserting a bus request. Again, because of this arbitration process, overhead is added to each transaction that may occur and system performance may be reduced.

Bus Parking

One method of reducing the overhead associated with the arbitration process is to use "bus parking". Bus parking involves a particular bus master having a default bus grant. When a bus master is "parked" on the bus, it need not request access to the bus before initiating a transaction. Consequently, the overhead associated with bus access arbitration is eliminated for transactions initiated by a parked bus master. There are many ways of choosing which bus master is able to park on the bus. One method is to allow the last bus master to control the bus to have the parked status. This method can be particularly useful when one bus master is more active than the others. Another method is to grant parked status to a bus master which is predicted to next require access to the bus. Among the other methods of choosing which bus master is assigned parked status include a rotating selection or a predetermined constant selection.

Figure 2:
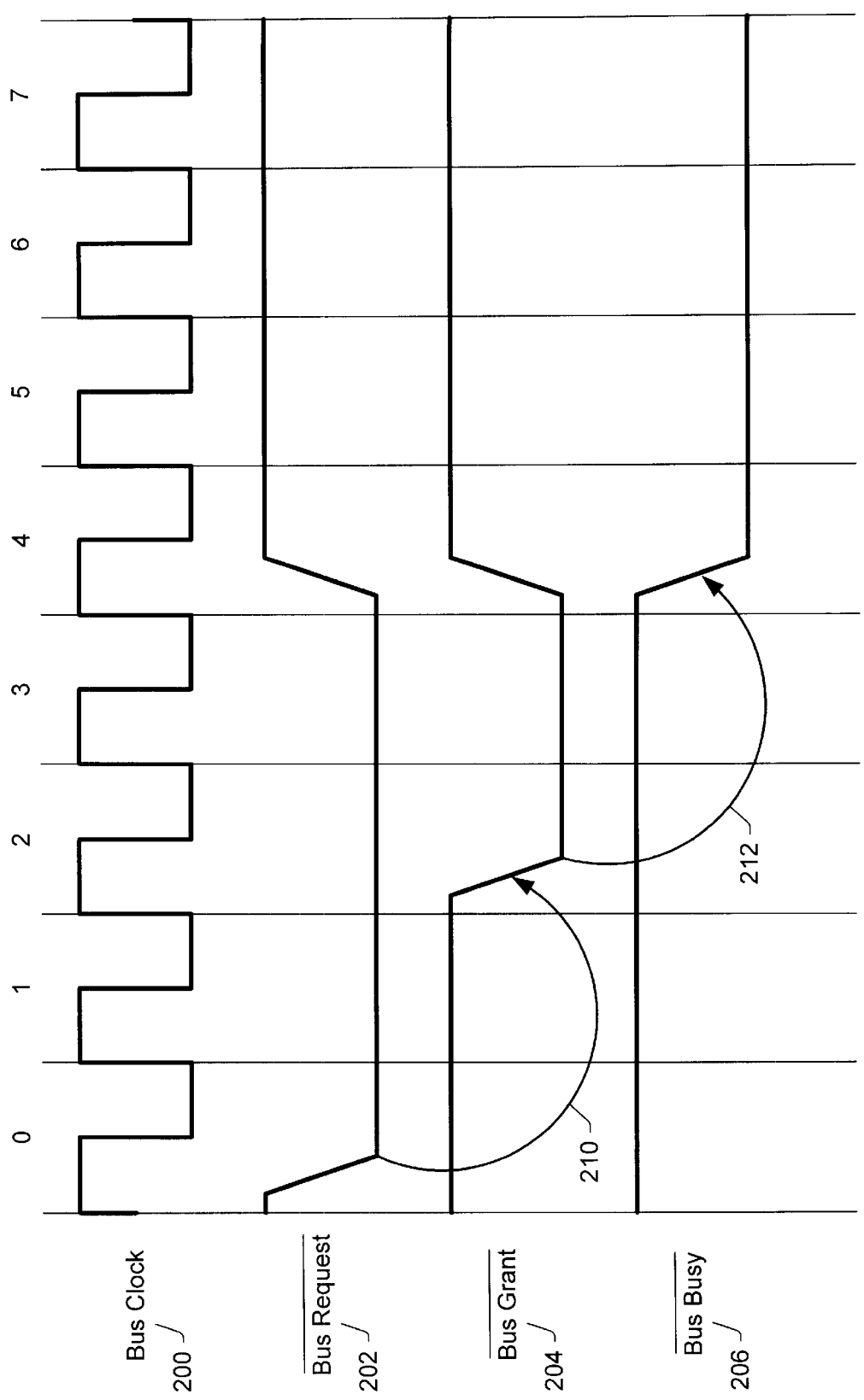
FIG. 2 is a timing diagram illustrating bus arbitration without a parked bus master.

FIG. 2 shows a timing diagram in which bus parking is not used. The signals and timing of signals in FIG. 2 are for illustrative purposes only. Many different embodiments are possible and are contemplated. Included in the diagram are a bus clock signal 200, bus request signal 202, bus grant signal 204 and a bus busy signal 206. Bus request signal 202, bus grant signal 204 and bus busy signal 206 are all active low. Numbers across the top of the diagram in FIG. 2 represent successive bus clock 200 cycles. Bus request signal 202 is output by a bus master requiring access to the bus. Bus grant signal 204 is output by a bus arbiter. Finally, bus busy signal 206 may represent the beginning of a transaction by the bus master on the requested bus. During bus clock cycle 0, a bus master indicates a need for the bus by asserting the bus request signal 202. Subsequent to the bus request, the arbiter asserts the bus grant signal 204 in clock cycle 2, as indicated by the arc 210. Subsequent to receiving the bus grant signal 204, the bus master begins a bus transaction during bus clock cycle 4 by asserting the bus busy signal 206. Arc 212 indicates that them assertion of the bus busy signal 206 in bus clock cycle 4 results from the assertion of the bus grant signal 204 in bus clock cycle 2. As FIG. 2 shows, when a bus master requires access to the bus it must first request and be granted access. In the diagram of FIG. 2, the bus master requests access in bus clock cycle 0, receives a bus grant in bus clock cycle 2, and finally begins a transaction in bus clock cycle 4. Consequently, in this example, arbitration for the bus takes four bus clock cycles.

Figure 3:
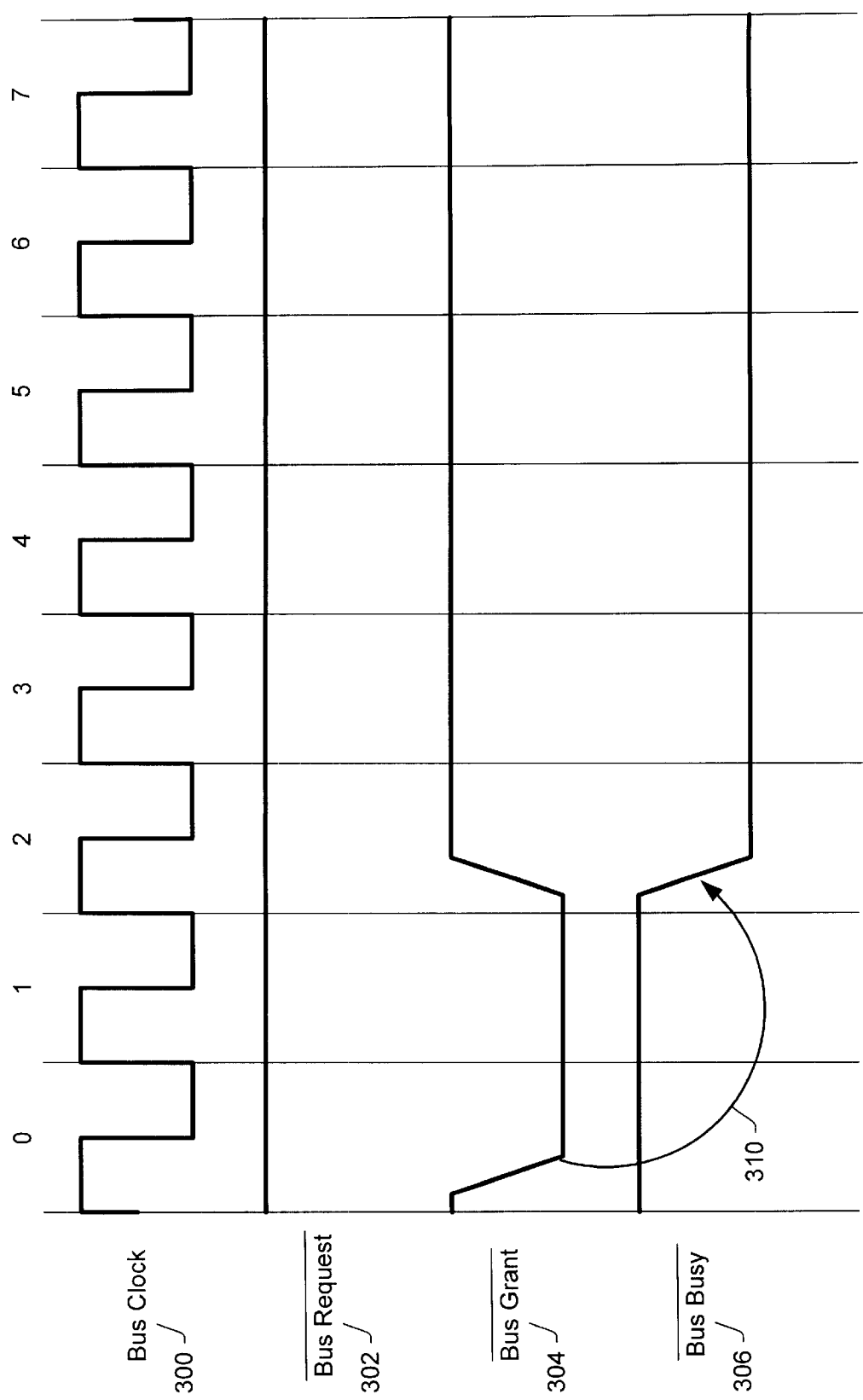
FIG. 3 is a timing diagram illustrating bus arbitration with a parked bus master.

FIG. 3 shows a timing diagram illustrating a case where bus parking is used. Included in the diagram are a bus clock signal 300, bus request signal 302, bus grant signal 304 and a bus busy signal 306. Bus request signal 302, bus grant signal 304 and bus busy signal 306 are all active low. Numbers across the top of the diagram in FIG. 3 represent successive bus clock 300 cycles. Bus request signal 302 is output by a bus master requiring access to the bus. Bus grant signal 304 is output by a bus arbiter. Finally, bus busy signal 306 may represent the beginning of a transaction by the bus master on the requested bus. During bus clock cycle 0, the bus master requires access to the bus. Rather than broadcasting this need for the bus by asserting bus request signal 302, the assertion of bus grant signal 304 indicates the bus master may begin a bus transaction. The bus master then begins a transaction, as indicated by the assertion of bus busy signal 306 in bus clock cycle 2. Arc 310 indicates that the assertion of bus busy signal 306 results from the assertion of bus grant signal 304. The assertion of bus grant signal 304 may be in response to an internal indication of a need for the bus by the bus master. In this case, the overhead of two bus clock cycles required for arbitration have been eliminated. Alternatively, no bus grant signal 304 assertion may be required. If no bus grant signal 304 is required, the bus master may begin the transaction in bus clock cycle 0, rather than in bus clock cycle 2. In this case, the overhead of four bus clock cycles required for arbitration may be eliminated.

Potential Starvation of Parked Bus Master

Because there may be devices on a shared bus which may bypass ordinary bus arbitration, potential problems may arise. In some network configurations, a device such as a repeater may have priority over other bus masters when issuing high priority requests. Typically, if such a high priority device currently controls the bus and another bus master requires access to the bus, the other bus master asserts a bus request to indicate its need. Having been made aware of the bus request, the high priority device may yield the bus when appropriate. However, because parked bus masters do not issue a bus request prior to initiating a bus transaction, certain means of ensuring proper operation must be used. For example, to prevent a parked bus master from beginning a transaction while a high priority device is issuing transactions, a signal may be used which prevents the parked bus master from starting a transaction. In one embodiment, a high priority request signal, preReq, may be used by a high priority device to indicate to the parked bus master that a high priority transaction is in progress. While the preReq signal is asserted, the parked bus master may not begin a transaction.

While using a high priority request signal such as preReq may prevent a parked bus master from beginning a transaction, its use also gives rise to a potential problem. Because a parked bus master does not issue a bus request when it requires access to the bus, if a high priority device issues a stream of transactions and uses the preReq signal to inhibit the start of a transaction from a parked bus master, the high priority device will not know when the parked bus master requires access to the bus. Consequently, the parked bus master may not gain access to the bus for a significant period of time. One solution to this problem is for the high priority device to stop periodically to allow a parked bus master access to the bus if needed. However, requiring the high priority device to stop periodically may lead to unnecessary delays and reduced performance when no parked bus master requires access to the bus.

Parked Bus Master Counter

In order to eliminate unnecessary delays introduced by periodically stopping a high priority device, a counter is used by a parked bus master. When a high priority device begins a transaction and asserts the preReq signal, a parked bus master begins counting the number of consecutive clock cycles it sees a high priority transaction. Upon seeing a particular number, N, of consecutive high priority cycles, the parked bus master may issue a bus request if access to the bus is needed. Having been made aware of the need for the bus by the parked bus master, the high priority device may then stop and yield the bus at a convenient time. While the high priority device may still have the right to continue issuing transactions, it no longer has to stop periodically to check if a parked bus master requires access to the bus. Further, if the parked bus master's bus request is not yielded to by the high priority device, the priority of the parked bus master's request may be elevated over time, so that it is guaranteed to eventually gain access to the bus.

Figure 4:
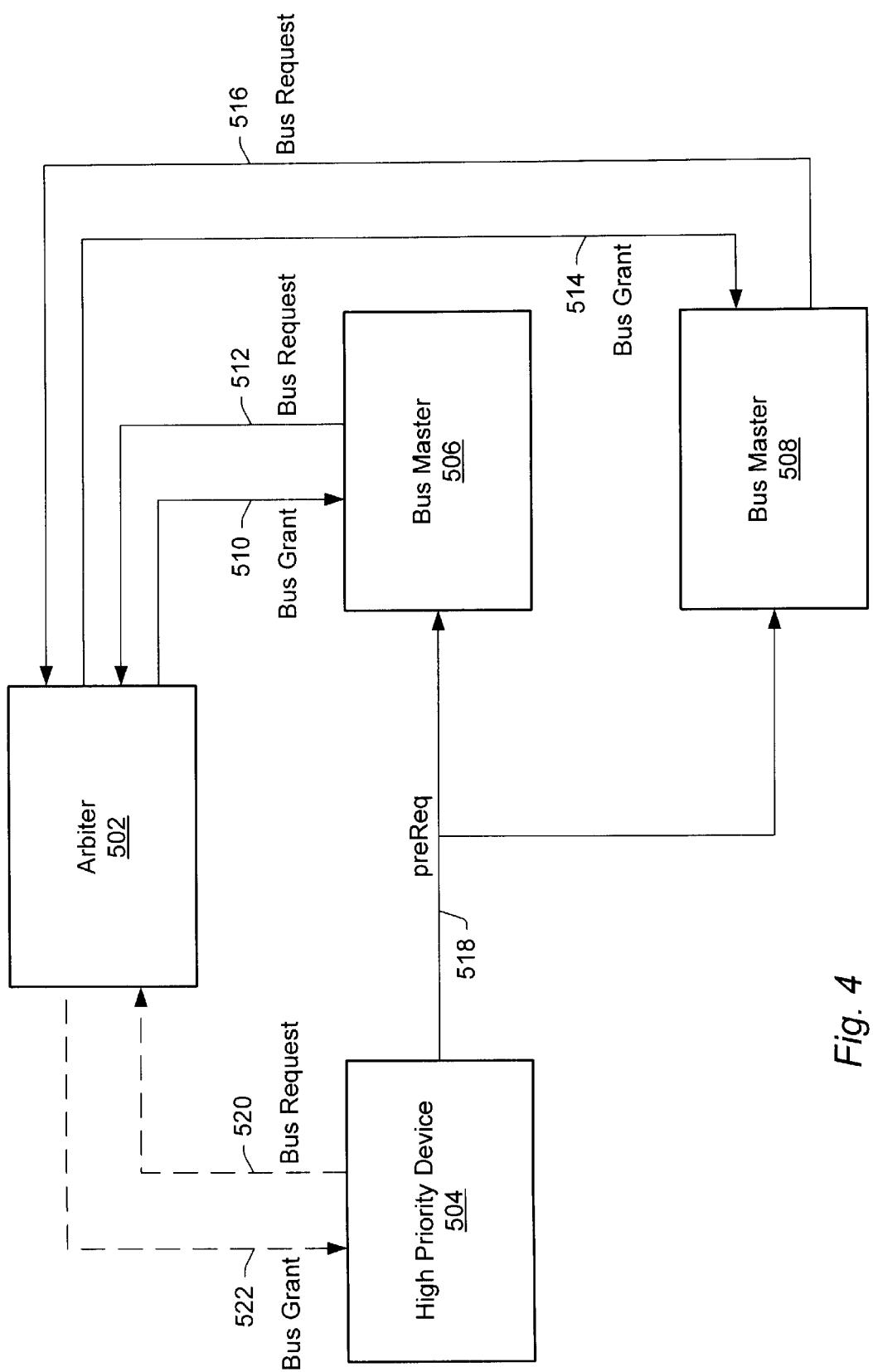
FIG. 4 is a block diagram illustrating one embodiment of the interconnection between an arbiter, bus masters and high priority device.

FIG. 4 is a block diagram showing one embodiment of the interconnection between two bus masters, 506 and 508, a central arbiter 502 and a high priority device 504. Bus master 506 is coupled to arbiter 506 via a bus request signal 512 and a bus grant signal 510. Bus master 508 is coupled to arbiter 506 via a bus request signal 516 and a bus grant signal 514. High priority device 504 is coupled to bus master 506 and bus master 508 via preReq signal 518. High priority device 504 may be coupled to arbiter 502 via a bus request signal 520 and bus grant signal 522. Bus request signal 520 and bus grant signal 522 are dashed to indicate such a connection is optional. High priority device 504 may optionally be configured to participate in bus access arbitration via bus request signal 520 and bus grant signal 522. In fact, high priority device 504 may be a bus master such as bus master 506 or bus master 508, with the added ability to issue high priority requests and inhibit other bus masters via a high priority preReq signal.

In the embodiment of FIG. 4, a central arbiter 504 monitors bus requests from bus masters 506 and 508. Arbiter 502 grants access to bus master 506 via bus grant signal 510 or bus master 508 via bus grant signal 514. When high priority device 504 issues a high priority request it asserts high priority request signal, preReq 518. Assertion of preReq 518 by high priority device 504 inhibits a parked bus master from beginning a transaction. In the embodiment in FIG. 4, either bus master 506 or bus master 508 may be parked. As discussed above, if the parked bus master requires access to the bus and is currently inhibited from beginning a transaction by the assertion of the preReq 518 signal, the parked bus master will assert a bus request upon seeing a threshold number of consecutive high priority bus cycles. In the embodiment of FIG. 4, the circuitry to detect the threshold condition and issue the bus request is located within the parked bus master. However, other embodiments are contemplated, including using a separate logic device and locating the circuitry within the bus arbiter.

Figure 5:
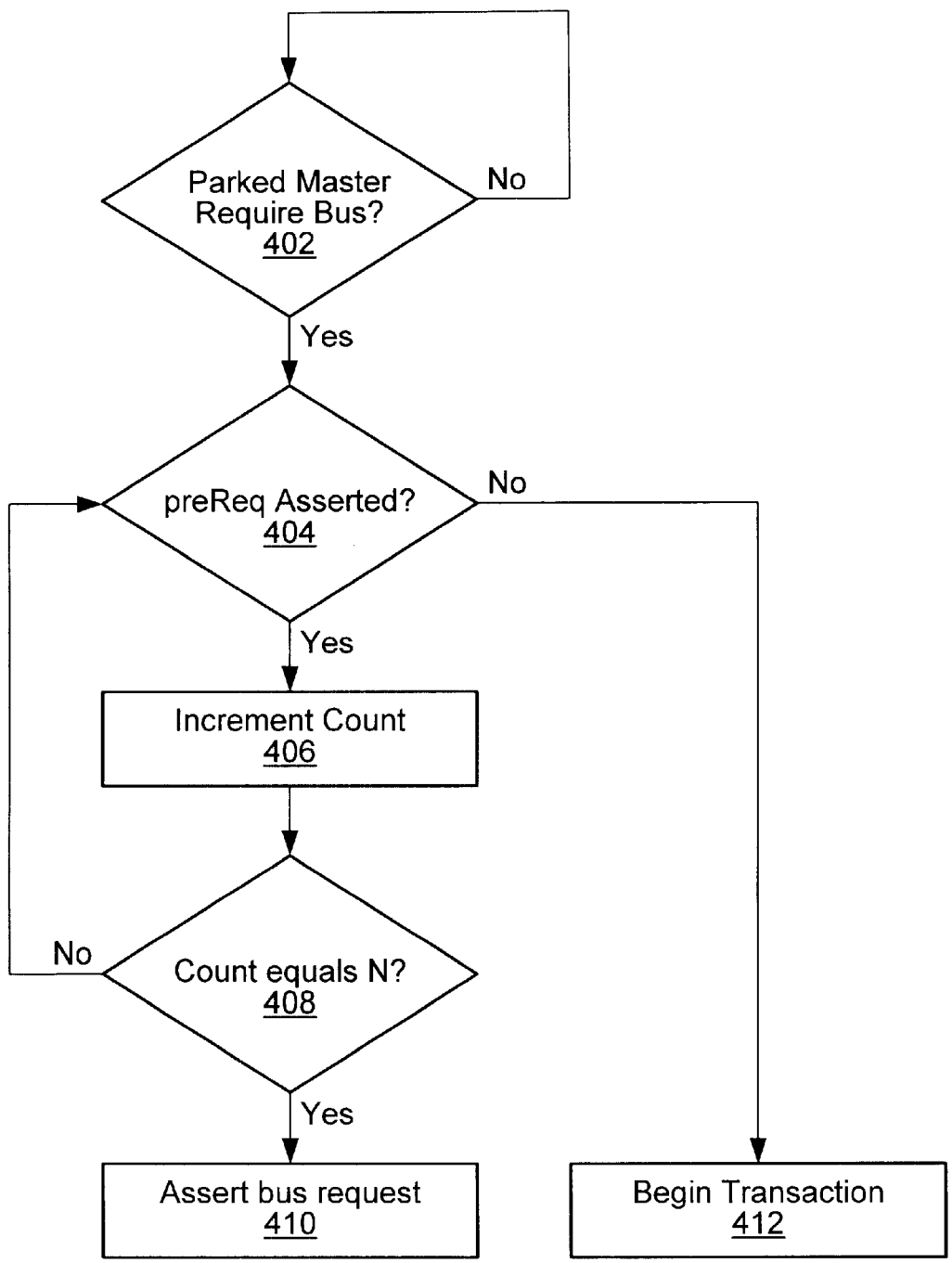
FIG. 5 is a flowchart illustrating a method of gaining bus access.

FIG. 5 is a flowchart illustrating the general method which may be used to gain bus access for a parked bus master. Decision block 402 determines if there is a parked bus master which requires access to the bus. If there is not, the flow remains in block 402. However, if there is a parked bus master requiring bus access the flow moves to decision block 404. Decision block 404 queries whether the high priority request signal, preReq, is asserted. If preReq is not asserted, then the parked bus master may begin a transaction 412. If preReq is asserted, a count is incremented 406 and a check is made to determine if the count equals a threshold, N, 408. If the threshold is not met, flow returns to decision block 404 where the preReq signal is checked on the following bus cycle. If the threshold has been met, then the parked bus master asserts a bus request 410. This method above enables a parked bus master to request access to a shared bus when needed.

Figure 6:
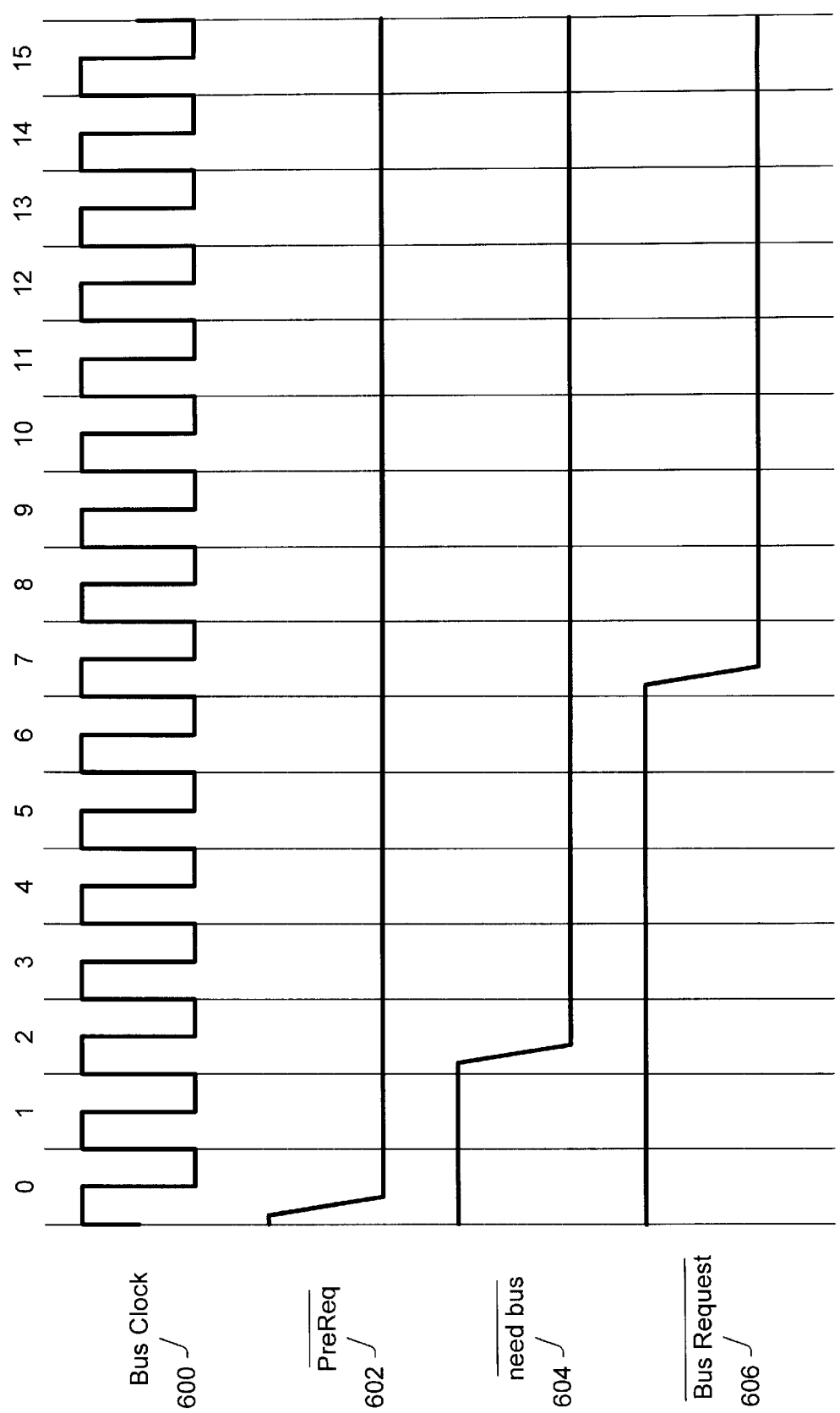
FIG. 6 is a timing diagram illustrating a bus request by a parked bus master.

Turning now to FIG. 6, a timing diagram illustrating a bus request by a parked bus master is shown. Included are a bus clock 600, a high priority request signal 602 from a high priority device, a need for bus signal 604 from a parked bus master, and a bus request signal 606 from a parked bus master. In bus clock 600 cycle 0, a high priority device asserts preReq signal 602 indicating a high priority transaction is in progress. The assertion of prereq 602 inhibits the parked bus master from beginning a transaction. In bus clock 600 cycle 2, the assertion of signal need bus 604 indicates the parked bus-masters requires access to the bus. The need bus signal 604 may be an indication internal to the parked bus master which is not seen by other devices connected to the shared bus. Because the parked bus master detects the assertion of the preReq signal 602, a transaction is not started. In the embodiment of FIG. 6, the parked bus master begins counting bus cycles in which it requires the bus and the preReq signal 602 is asserted. In FIG. 6, the parked bus master is configured to detect of threshold of four consecutive cycles in which preReq 602 is asserted and the bus is required. Upon detecting four such cycles, bus clock 600 cycles 3–6, the parked bus master asserts bus request signal 606. Consequently, the high priority device may be made aware of the need for the bus by the parked bus master and may stop when convenient.

The method and apparatus described above permits a parked bus master to make known its need for access to a common bus. Advantageously, a high priority device need not stop periodically to check for a parked bus master which may need access to the bus. Rather, a high priority device may stop when convenient. Consequently, performance may be improved.

It is noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value.

Numerous variations and modifications will become apparent to those skilled in the art once the above disclosure is fully appreciated. It is intended that the following claims be interpreted to embrace all such variations and modifications.

What is claimed is:

1. A computer network comprising:
   a plurality of bus masters coupled to a bus, wherein a first bus master of said plurality of bus masters which is parked on said bus is configured to assert a bus request, in response to detecting a threshold number of consecutive high priority cycles on said bus and said first bus master requires access to said bus; and
   a high priority device, wherein said high priority device is coupled to said bus, and wherein said high priority device is configured to inhibit said first bus master from beginning a transaction on said bus.

2. The computer network of claim 1, wherein said plurality of bus masters arbitrate for access to said bus using a distributed arbitration scheme.

3. The computer network of claim 1, wherein said plurality of bus masters arbitrate for access to said bus using a centralized arbitration scheme.

4. The computer network of claim 1, wherein said high priority device is configured to inhibit said first bus master from beginning a transaction on said bus by asserting a high priority request signal.

5. The computer network of claim 1, wherein said first bus master comprises:
   a counter, wherein said counter counts high priority cycles seen on said bus; and
   bus access circuitry, wherein said bus access circuitry is configured to assert a bus request on said bus, in response to said counter detecting a threshold number of consecutive high priority cycles on said bus and said first bus master requires access to said bus.

6. The computer network of claim 1, wherein said first bus master is configured to assert a second bus request subsequent to said first bus request, wherein the priority of said second bus request is higher than the priority of said first bus request, in response to detecting said first bus request is not granted and said first bus master requires access to said bus.

7. A bus master, wherein said bus master comprises:
   a counter, wherein said counter counts the number of consecutive high priority cycles on a bus; and
   bus access circuitry, wherein said bus access circuitry is configured to assert a bus request on said bus, in response to said counter detecting a threshold number of consecutive high priority cycles on said bus and said bus master requires access to said bus.

8. The bus master of claim 7, wherein said bus master is configured to park on said bus.

9. The bus master of claim 7, wherein said bus master is configured to be inhibited from beginning a transaction on said bus when said bus master is parked on said bus, in response to detecting the assertion of an inhibit signal.

10. The bus master of claim 9, wherein said inhibit signal comprises a high priority request signal.

11. The bus master of claim 7, wherein said bus master is configured to assert a second bus request subsequent to said first bus request, wherein the priority of said second bus request is higher than the priority of said first bus request, in response to detecting said first bus request is not granted and said bus master requires access to said bus.

12. The bus master of claim 7, wherein said bus master is configured to arbitrate for access to said bus using a distributed arbitration scheme.

13. The bus master of claim 7, wherein said bus master is configured to arbitrate for access to said bus using a centralized arbitration scheme.

14. A method comprising:
   parking a bus master on a bus; and
   issuing a high priority transaction on said bus, wherein said high priority transaction is issued by a high priority device; and
   inhibiting said bus master from issuing a transaction on said bus by asserting an inhibit signal, wherein said inhibit signal is asserted by said high priority device; and
   counting consecutive high priority cycles on said bus, wherein said high priority cycles correspond to said high priority transaction; and
   issuing a first bus request, wherein said first bus request is issued by said bus master, in response to detecting a threshold number of said consecutive high priority cycles on said bus and said bus master requires access to said bus.

15. The method of claim 14, further comprising issuing a second bus request, wherein said second bus request is subsequent to said first bus request, wherein the priority of said second bus request is higher than the priority of said first bus request, in response to detecting said first bus request is not granted and said bus master requires access to said bus.

16. The method of claim 14, wherein said inhibit signal comprises a high priority request signal.

17. The method of claim 14, further comprising arbitrating for access to said bus, wherein said arbitrating comprises a plurality of bus masters requesting access to said bus, and wherein a first bus master of said plurality of bus masters is subsequently granted access to said bus.

18. The method of claim 17, wherein said first bus master is said bus master.

19. The method of claim 14, wherein said arbitrating comprises a distributed arbitration scheme.

20. The method of claim 14, wherein said arbitrating comprises a central arbitration scheme.

* * * * *